Figure 1:
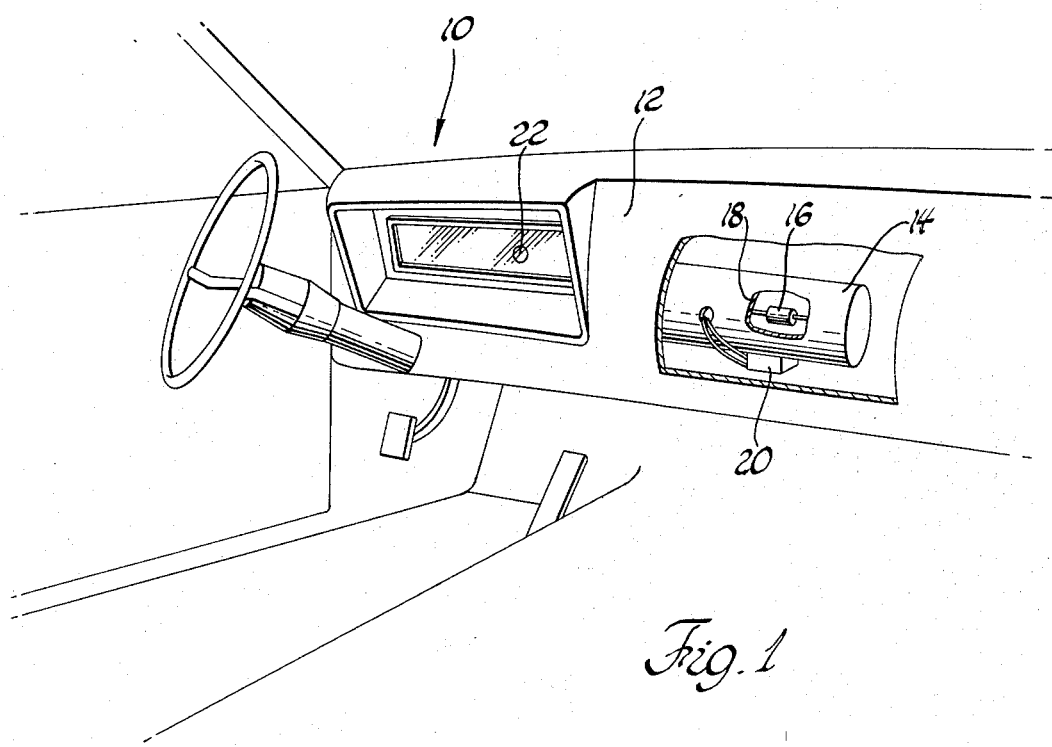

United States Patent

Schaefer

[15] 3,691,521
[45] Sept. 12, 1972

[54] LOW PRESSURE INDICATOR FOR AIR BAG SAFETY SYSTEM

[72] Inventor: Michael D. Schaefer, Sterling Heights, Mich.

[73] Assignee: Allied Chemical Corporation, New York, N.Y.

[22] Filed: May 3, 1971

[21] Appl. No.: 139,492

[52] U.S. Cl. .............................. 340/52 R, 340/240
[51] Int. Cl. .............................................. B60r 21/00
[58] Field of Search ....340/52 R, 52 C, 60, 240, 242; 307/10; 73/40; 180/82

[56] References Cited

UNITED STATES PATENTS 3,281,784   10/1966   Farthing ..................... 340/58

Primary Examiner—Alvin H. Waring
Attorney—Barnard, McGlynn & Reising

[57] ABSTRACT

An indicator light is energized when the pressure in a nitrogen storage tank forming part of an air bag safety system falls below a predetermined level. A carbon resistor disposed within the tank is connected in a voltage divider circuit feeding the input of a first transistor switching circuit. When normal high pressure is maintained in the tank the resistor has a relatively low resistance value so as to maintain a first transistor in a conductive state. A second transistor switching circuit is thereby maintained in a non-conductive state, effectively opening the indicator light circuit. When the pressure in the tank falls below a predetermined threshold the resistance increases to a point where the first transistor circuit becomes non-conductive forcing the second transistor in a conductive state so that the lamp is energized signalling the driver of this failure condition.

9 Claims, 2 Drawing Figures

PATENTED SEP 12 1972

3,691,521

INVENTOR.
Michael D. Schaefer
BY

Barnard, McElynn & Reising
ATTORNEYS

LOW PRESSURE INDICATOR FOR AIR BAG SAFETY SYSTEM

BACKGROUND OF THE INVENTION

1. Field of the Invention

This invention relates to automotive safety systems which operate in the event of a collision to discharge gas from a pressurized tank into an air bag so as to cushion the occupant and more particularly to an indicator for signalling the driver when the pressure in the tank falls below a safe value.

2. Prior Art

In recent years intensive efforts have been directed toward development of systems for use in automotive vehicles which cause bags to inflate upon the vehicle being involved in an impact which might potentially cause harm to the occupants. The bags are disposed so as to receive and absorb the forward motion of the occupants as a result of the sudden deceleration of the vehicle. In certain classes of such air bag systems, the bags are inflated from pressurized tanks of inert gas, such as nitrogen.

Such systems must always be in condition for instantaneous use although years may elapse before a particular system is actually energized upon the occurrence of a dangerous impact. It is accordingly desirable to provide some means for checking the pressure in the gas tanks in order to evaluate the readiness of the system. It is desirable that such pressure checking system be relatively simple so as to be low in initial cost and highly reliable in operation. It is also desirable that the system be fail-safe so that if any of its components become inoperative the danger signal will be generated.

SUMMARY OF THE PRESENT INVENTION

The present invention contemplates such a low pressure sensing indicator for a pressurized gas tank for an air bag system. The invention utilizes a pressure sensor disposed within the tank and connected to an indicator light disposed externally of the tank in a position so as to capture the driver's attention when it is energized.

In a preferred embodiment of the invention, which will subsequently be disclosed in detail, the sensor takes the form of a normal carbon resistor. Such resistors have an inverse pressure-resistance characteristic. The resistor is connected in a voltage divider circuit which is disposed between a regulated voltage power supply and the base of a first grounded emitter NPN transistor. The connection is such that in response to an increase in resistance of the sensing resistor the voltage on the base of the transistor goes more negative, switching the transistor from a conducting to a non-conducting state. The voltage divider is adjusted so that with normal pressure in the tank the transistor is maintained in a conducting state.

The collector of this first transistor is connected to the base of a second grounded emitter switch NPN transistor so as to maintain that second transistor in a non-conductive state as long as the first transistor is conductive. The indicator lamp is connected in the collector circuit of the second transistor so as to be switched on and off with the transistor. Thus the lamp is normally off.

In the event the pressure in the gas tank falls below a predetermined level the sensor resistance increases so as to lower the voltage on the base of the first transistor and cause it to shut off. This raises the voltage at the base of the second transistor so as to switch it to a conductive state and cause the lamp to energize.

If the sensing resistor should crack or crystallize its resistance will increase to a level at which the lamp is energized. Thus, the system is fail-safe in the most probable failure mode.

Figure 2:
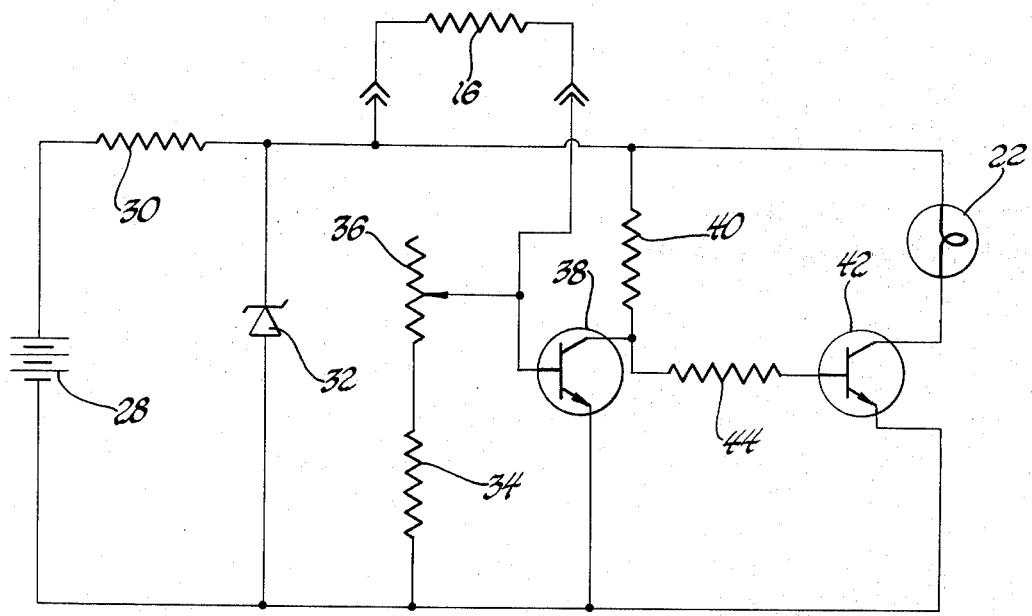

Other objectives and advantages of the invention will be made apparent by the following detailed description of two preferred embodiments of the invention. The description makes reference to the accompanying drawings, in which:

FIG. 1 is a view illustrating the physical location of the components forming a preferred embodiment of the invention; and FIG. 2 is an electrical schematic diagram of the circuit of the first preferred embodiment to the invention.

The present invention is preferably employed in an automotive vehicle and a section of the dashboard of an automobile incorporating the invention is illustrated in perspective in FIG. 1 and generally indicated at 10. A section of the dashboard 12 of the vehicle is cut away for purposes of illustration in FIG. 1 to reveal the enclosed pressure tank 14 of the type used in connection with presently proposed air bag safety systems.

Many details of the air bag system are not of significance to the disclosure of the present invention but the system preferably will be of the type illustrated in U.S. Patent No. 3,451,694 wherein a full inflatable bag is connected to the tank 14 by means of a valve. Upon detection of a collision situation appropriate mechanism opens the valve and allows pressurized inert gas, such as nitrogen, contained within the tank 14, to inflate the bag into a position where it acts as a resilient barrier between the occupant of the seat of the vehicle and various surfaces of the car.

The pressurized container 14 may also be used in connection with a pyrotechnic apparatus for generating gas. In either class of system the need for warning the driver of an abnormally low pressure within the tank is apparent.

While the tank 14 is illustrated as being disposed behind the dashboard 12 it may be located at other positions within the vehicle. The tank 14 contains inert gas, preferably nitrogen. The gas may normally be at a pressure of approximately 2,300 pounds-per-square-inch. When the pressure falls below about 1,500 p.s.i., due to leakage from the tank the system may not operate properly and the driver should be made aware of this potentially dangerous condition.

The pressure indicator system forming a preferred embodiment of the invention employs as a sensor a normal carbon resistor 16 which is suitably disposed within the tank 14 so as to be subject to the pressure therein. The section of the tank 14 is broken away in FIG. 1 to illustrate this position of the resistor 16 therein. The two leads from the resistor are brought through the wall of the tank through a standard glass-to-metal seal 18 and are connected to an electronic assembly contained within a box 20 supported below the tank.

An indicator light 22 is affixed on the dashboard of the vehicle so as to be readily visible to the driver. A red lens may be employed to heighten the visibility of the light. In other embodiments of the invention the indicator light may include flasher circuit or an audio alarm such as a buzzer may be used instead of or along with the indicator light.

FIG. 2 illustrates the electrical circuit employed to energize the light 22 at such time as the pressure within the tank 14 falls below a predetermined value such as 1,500–1,800 p.s.i. at which the driver should be warned of the potential inoperability of the system.

The system derives its power directly from the vehicle battery 20 so that a dangerously low tank pressure is not masked by a fuse failure. The battery 28 is connected in series with a current limiting resistor 30 across a Zener diode 32 which provides a regulated voltage which is lower than the normal minimal operating voltage of the battery. For example, with a 12-volt battery the Zener will provide approximately 10 volts.

The sensing resistor 16, which is disposed within the tank 14, is connected in series with a combination of a fixed resistor 34 and a variable resistor 36 across the Zener diode 32.

The adjustable end of the variable resistor 36 is connected to the base of a first NPN transistor 38 which has its emitter grounded and its collector connected to the positive terminal of the Zener through a fixed resistor 40.

The setting of the variable resistor 36 is adjusted so that the base-emitter voltage of the transistor 38 is sufficiently positive to cause the transistor to conduct; i.e. a relatively high current flows through the collector circuit. This adjustment is made when normal pressure is maintained in the tank 14 so that the resistance 16 is relatively low. In the event that the pressure in the tank decreases to the preselected point of approximately 15,000–18,000 p.s.i. the lowering of pressure on the resistor 16 causes an increase in resistance of approximately 10–15 percent. For example, the resistor 16 may be a one-half watt 5 percent carbon resistor having a manual rating of 16,000 ohms. This effectively lowers the base-emitter voltage sufficiently to cause the transistor 38 to become non-conductive.

The collector of the transistor 38 is connected to the base of a second NPN transistor 42 through a resistor 44. The transistor 42 has its emitter grounded and has its collector connected to the positive terminal of the Zener diode 32 through the lamp 22.

When the transistor 38 is conductive the base-emitter voltage of the transistor 42 is so negative as to prevent substantial conduction in the emitter-collector circuit and the lamp 22 is not energized. However, when the transistor 38 becomes non-conductive the base of the transistor 42 is effectively connected to the positive terminal of the power supply the relatively low value resistors 40 and 44 causing the transistor 42 to become conductive. The lamp 22 is thereby energized signalling the driver of the pressure drop in the tank 14.

In the vent of cracking or crystalizing of the resistor 16 or any one of its connections, a probable mode of failure of the system, the increased resistance turns off the transistor 38 and turns on the transistor 42, thereby energizing the lamp. Similarly, a failure of the transistor 38 which would render a non-conductive causes the lamp to light.

The use of the low cost carbon resistor as the sensing element lowers the cost of the circuit to a level which allows its implementation as a safety circuit.

Having thus described my invention, I claim:

1. In an occupant restraint system for an automotive vehicle including an inflatable element and a tank of pressurized gas adapted to be used to inflate said element under certain conditions, apparatus for signalling the vehicle operator when the gas pressure in said tank is below a predetermined pressure, comprising a device disposed within said tank having electrical characteristics which are a function of the ambient pressure, a bistable circuit connected to said device having such configuration as to exist in a first state when the electrical characteristics of the device are those associated with an ambient pressure above a predetermined level and in a second state when the electrical characteristics of the device are those associated with an ambient pressure below said predetermined level, a power supply connected to the bistable circuit, and a signalling device connected to the bistable circuit and the power supply, so as to energize said signalling device from the power supply at such time as the bistable is in its first state and to deenergize said signalling device from the power supply at such time as it is in its second state.

2. The system of claim 1 wherein the device disposed within said tank is a resistive element having a resistance which varies inversely with the ambient pressure.

3. The system of claim 2 wherein the resistance is a carbon resistor.

4. The system of claim wherein said signalling device comprises a lamp.

5. The system of claim 1 wherein said bistable circuit includes a semi-conductive switching device.

6. A system for use in connection with an automotive restraint apparatus which includes an inflatable bag and a tank of pressurized gas which is used to inflate said bag under certain conditions, said system being operative to provide a signal when the pressure in said tank falls below a predetermined level, and including an electrical element disposed within said tank and having an electrical characteristic which is a function of the ambient pressure on the element, a power supply, a semi-conductor switching device connected to the electrical element and the power supply so as to be in a non-conductive state when said electrical characteristic of said electrical element is that associated with ambient pressures above the predetermined level, and to be in a conductive state when the electrical characteristic of said device is that associated with ambient pressures below said predetermined level, and a signalling device connected to said power supply and said semi-conductor switching device so as to be energized at such time as said semi-conductor switching device is in a conductive state.

7. The system of claim 6 wherein the characteristic of the electrical element which is a function of its ambient pressure constitutes its resistance, and its resistance varies inversely with the ambient pressure.

8. The system of claim 6 wherein said electrical element has a resistance which varies as a function of the ambient pressure and including a resistive element connected in series with said electrical element across the power supply so as to form a voltage divider, and a connection between the mid-point of such voltage divider and the semi-conductor device so that the voltage applied to said semi-conducted device is a function of the pressure in said tank.

9. An electric system for use in connection with an automotive restraint system which has an inflatable bag and a pressurized tank of gas which is adapted to be used to inflat said bag at certain times, said system including a first resistor having a pressure sensitive resistance characteristic disposed within said tank; a second resistor connected in series with said first resistor; a direct current power supply connected across the series combination of said first and second resistors; a first semi-conductive switching device having one element connected to one terminal of power supply and the other element connected to the connection between said first and second resistors so that the voltage applied across said first and second elements varies as a function of the resistance of said first resistor; said first semi-conductive device having such characteristics that it is only conductive when the pressure within said tank is sufficiently high to maintain the resistance of said first resistor below a predetermined level; a second semi-conductive device connected to said first semi-conductive device and the power supply so as to conduct only at such times as said first semi-conductive device is non-conductive; and a signalling device connected to said second semi-conductive device and to said power supply so as to be energized at such time as said second conductive device is conductive, whereby said signalling device is energized only at such times as the pressure within said tank is sufficiently low so that the resistance of said first resistor is sufficiently high to cause said first semi-conductive device to be non-conductive.

* * * * *

PO-1050
(5/69)

UNITED STATES PATENT OFFICE
CERTIFICATE OF CORRECTION

Patent No. 3,691,521        Dated October 2, 1972

Inventor(s) Michael D. Schaefer

It is certified that error appears in the above-identified patent and that said Letters Patent are hereby corrected as shown below:

Column 1, line 5, Delete "1.".

line 11, After line 11, insert title -- Background of the Invention -- line 12, Delete "2."

Column 3, line 29, Before "collector" insert -- emitter- --

Column 4, Claim 4, line 29, after "of claim" insert -- 1 --

Column 5, line 4, After "used to" delete "10"

Column 6, line 10, after "second", insert -- semi- --

Signed and sealed this 6th day of March 1973.

(SEAL)
Attest:

EDWARD M. FLETCHER, JR.        ROBERT GOTTSCHALK
Attesting Officer               Commissioner of Patents